April 14, 1936.  W. FERRIS  2,037,373

HYDRAULIC LOCOMOTIVE

Filed Jan. 30, 1933  6 Sheets-Sheet 1

INVENTOR.
WALTER FERRIS.
BY
ATTORNEY.

April 14, 1936.   W. FERRIS   2,037,373
HYDRAULIC LOCOMOTIVE
Filed Jan. 30, 1933   6 Sheets-Sheet 3

INVENTOR.
WALTER FERRIS.
BY
ATTORNEY.

April 14, 1936.  W. FERRIS  2,037,373
HYDRAULIC LOCOMOTIVE
Filed Jan. 30, 1933   6 Sheets-Sheet 4

INVENTOR.
WALTER FERRIS.
BY
ATTORNEY.

April 14, 1936.  W. FERRIS  2,037,373
HYDRAULIC LOCOMOTIVE
Filed Jan. 30, 1933  6 Sheets-Sheet 5

INVENTOR.
WALTER FERRIS.
BY
ATTORNEY.

April 14, 1936.　　　　W. FERRIS　　　　2,037,373
HYDRAULIC LOCOMOTIVE
Filed Jan. 30, 1933　　　6 Sheets-Sheet 6

INVENTOR.
WALTER FERRIS.
BY
ATTORNEY.

Patented Apr. 14, 1936

2,037,373

UNITED STATES PATENT OFFICE 2,037,373

HYDRAULIC LOCOMOTIVE

Walter Ferris, Milwaukee, Wis., assignor to The Oilgear Company, Milwaukee, Wis., a corporation of Wisconsin Application January 30, 1933, Serial No. 654,157

17 Claims. (Cl. 105—62)

This invention relates to self-propelled vehicles of the type in which the motive power is produced by an engine and transmitted to traction wheels through a fluid transmission.

Self-propelled vehicles of this character are commonly known as locomotives, and that term is used herein to designate either a self-propelled vehicle which carries a load or a self-propelled vehicle which is employed solely for moving independently supported loads.

The locomotive to which the invention applies in particular is provided with a body or frame, one or more trucks arranged beneath the body to support it, one or more hydraulic motors carried by one or each of the trucks and connected to the wheels thereof to drive the same, a pump arranged upon the body and hydraulically connected to each motor to supply motive liquid thereto, an internal combustion or other type of engine arranged upon the body and connected to the pump to drive the same, and means for controlling the delivery of liquid to the motor or motors to thereby control the speed and the direction of actuation of the locomotive.

A hydraulic locomotive which is capable of producing high tractive forces is ordinarily incapable of attaining high speeds, and this invention has as an object to provide a hydraulic locomotive which will start under a heavy load from a stationary position and then accelerate to a high speed.

Another object is to provide a hydraulic locomotive which will translate a given amount of power into either high tractive forces or high speeds.

Another object is to provide a hydraulic locomotive which has a hydraulic transmission of a given volumetric capacity and which is capable of operating at speeds greatly in excess of the maximum speed heretofore attained by any prior hydraulic locomotive having a hydraulic transmission of the same volumetric capacity.

Other objects and advantages will appear from the description hereinafter given of the hydraulic locomotive illustrated in the accompanying drawings.

According to the invention in one of its aspects, the locomotive is provided with a plurality of motors for driving it, a pump for supplying motive fluid to the motors, means for varying the displacement of the motors to vary the speed of the locomotive, and means for rendering one motor ineffective and diverting its supply of fluid to the other motor or motors to thereby further increase the speed of the locomotive.

The invention further provides means for gradually reducing the displacement of one motor to its minimum efficient displacement and then suddenly reducing its displacement to zero and diverting its supply of fluid to another motor which has its displacement simultaneously increased by an amount corresponding to the volume of fluid thus diverted to it.

The invention is exemplified by the hydraulic locomotive illustrated in the accompanying drawings in which the views are as follows.

This locomotive is provided with two trucks 1 and 1ᵃ which carry, respectively, two center bearings 2 and 2ᵃ to support therethrough a frame or body 3 having two reversible variable displacement pumps 4 and 4ᵃ arranged thereon and driven, respectively, by two Diesel or other internal combustion engines 5 and 5ᵃ. The arrangement is such that the locomotive is substantially symmetrical about its transverse centerline, that is, if it were divided at its transverse centerline and one-half turned end for end, the two halves would be substantially identical. Consequently, the parts constituting the left half will be described herein and designated by reference numerals and corresponding parts of the right half designated by the same reference numerals with the exponent "a" added.

The truck 1 (Fig. 3) is provided with a near side-frame 6 and a far side-frame 7 which are supported at the left ends thereof upon an axle 8 and at the right ends thereof upon an axle 9 each of which has a traction wheel 10 fixed upon one end thereof and a traction wheel 11 fixed upon the other end thereof.

The traction wheels 10 are fixed upon the near end of the axle 8 and the far end of the axle 9 and adapted to be driven by the driving mechanism of the truck, and the traction wheels 11 are fixed upon the far end of the axle 8 and the near end of the axle 9 to be driven in synchronism with the wheels 10.

The axles 8 and 9 are each journaled at each end thereof in a bearing 12 one of which is fitted in each side-frame at each end thereof and adapted to slide vertically therein, and the side-frames are supported upon the axles 8 and 9 by four springs 13 one of which is arranged at each end of each side-frame in engagement with the top of the bearing 12 therein.

The side-frames 6 and 7 (Figs. 3 to 5) have arranged therebetween a housing 14 which is connected to the side-frames by a plurality of transverse webs 15 to form therewith the frame of the truck.

The truck has its driving mechanism arranged within the housing 14 which is closed at its top by a cover plate 16 having a hand hole 17 arranged in each end thereof and closed by a cover 18.

The housing 14 also supports the center bearing 2 which is arranged upon the longitudinal centerline of the truck but nearer the axle 8 than the axle 9 to normally impose a greater weight upon the axle 8 than upon the axle 9 when the locomotive is idle.

The center bearing 2 consists of a vertical post 19 which is supported at its lower end by a socket 20 arranged within the housing 14 and supported by suitable webs from the side walls thereof.

The post 19 has a bearing block 21 arranged thereon near its upper end and fastened between two struts 22 which are connected at the ends thereof to the side walls of the housing 14 to retain the post 19 in a vertical position and thereby enable it to transmit lateral and longitudinal forces from the truck to the body.

The post 19 is provided upon its upper end with a spherical head 23 having a flat horizontal top and supporting a bearing block 23' which is slidable upon the head 23 and has a spherical outer or upper surface formed upon the same radius as the head 23.

The post 19 supports a bearing cap 24 which is rigidly secured by four arms 25 to the body 3 and provided in its under side with a central recess 24'.

The recess 24' has arranged therein a bearing block 24'' which bears against the upper wall thereof and has its lower face formed complementary to the upper surface of the bearing block 23' and closely fitted thereon. The under face of the bearing block 24'' is provided with lubricating grooves (not shown) to which lubricant may be supplied in any suitable manner.

The bearing cap 24 has a cylindrical bore formed therein and extending upward from its lower face to the horizontal centerline of the spherical head 23 at which point it changes from a cylindrical to a spherical form for a short distance and opens into the recess 24'. The spherical part of the bore is complementary to the spherical outer surface of the head 23 but it is not fitted for a bearing thereon in order that all weight carried by the post 19 may be transmitted thereto through the bearing blocks 23' and 24''.

The center bearing per se forms no part of the present invention but is described and claimed in application Serial No. 759,886, filed December 31, 1934.

Figures 4, 9:
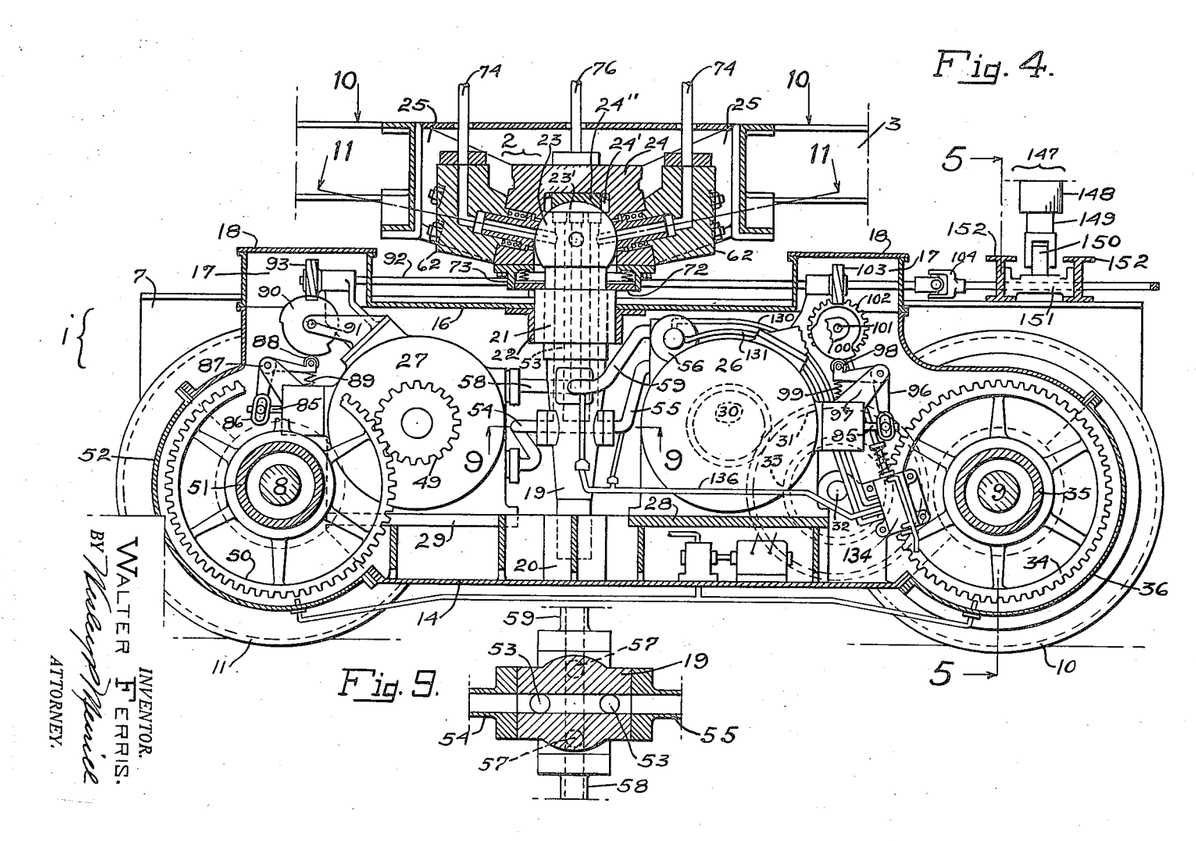
Fig. 4 is a longitudinal section through the truck taken on the irregular line 4—4 of Fig. 3.
Fig. 9 is a section through the center bearing post taken on the line 9—9 of Fig. 4.

The truck 1 is driven by two rotary variable displacement hydraulic motors 26 and 27 which are arranged within the housing 14 upon opposite sides of the transverse centerline of the truck and substantially upon opposite sides of the longitudinal centerline thereof and supported, respectively, upon two base plates 28 and 29 each of which is connected direct to one side of the housing 14 and connected to the bottom and the other side of the housing through suitable webs, as shown in Fig. 4.

Figure 3:
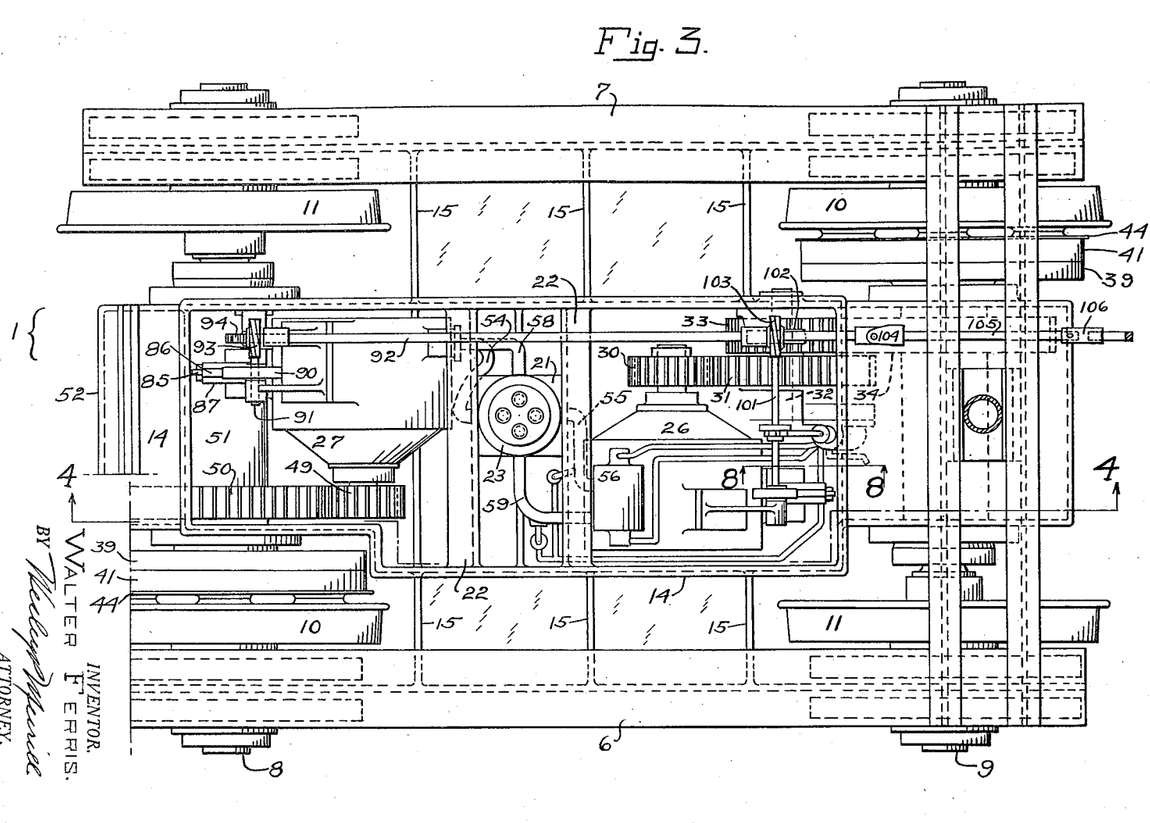
Fig. 3 is a top plan view of one of the trucks with the cover plate omitted from the housing which encloses the driving mechanism.

The motor 26 has a driving pinion 30 fixed upon its rotor shaft in mesh with an idler gear 31 fixed upon an idler shaft 32 which is journaled in bearings carried by the housing 14, as shown in Figs. 3 and 4.

Figure 5:
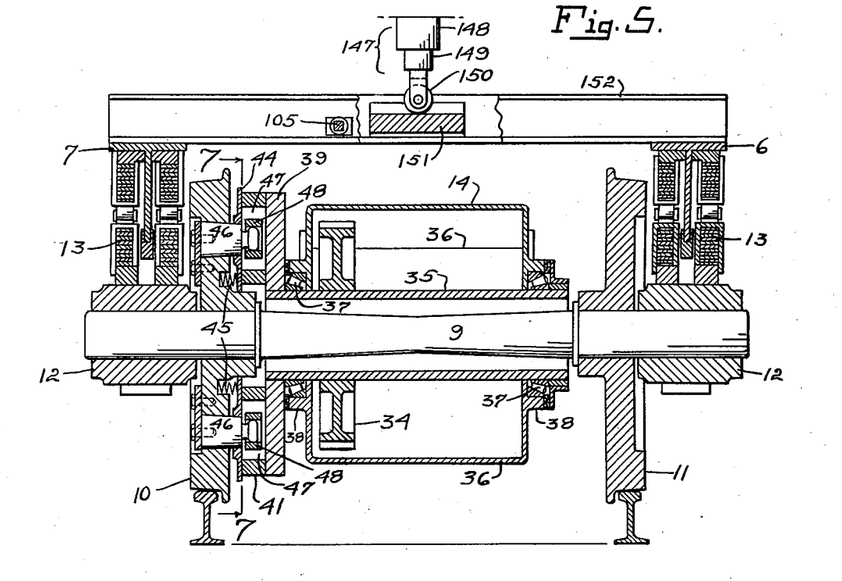
Fig. 5 is a transverse section through the truck taken on the line 5—5 of Fig. 4.

The idler shaft 32 has an idler pinion 33 fixed thereon in mesh with a driven gear 34 fixed upon a driving tube or quill 35 which surrounds the axle 9 and has each of its ends extended through the side walls of the housing 14 at the right end thereof, as shown in Fig. 5.

The housing 14 is provided upon its right end with a removable cap 36 which is joined to the side walls at an acute angle to the horizontal, and the quill 35 extends through the side walls of the housing 14 at the junction thereof with the cap 36 whereby removal of the cap 36 will permit the quill 35 and the axle 9 and its wheels to be removed from the truck when its right end is elevated.

The quill 35 is supported from the housing 14 by two roller bearings 37 one of which is arranged upon each end thereof in engagement with an annular flange 38 formed upon the outside of the housing 14 and its cap 36.

Figure 6:
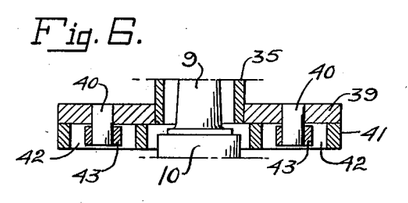
Fig. 6 is a section on the line 6—6 of Fig. 7 and shows a flexible connection through which driving forces are transmitted to a wheel.
Figure 7:
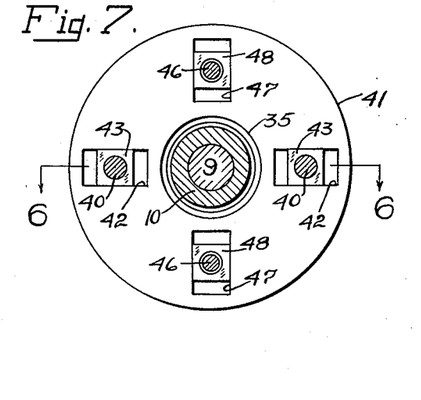
Fig. 7 is a section on the line 7—7 of Fig. 5.

As best shown in Figs. 5, 6, and 7, the quill 35 is connected to the traction wheel 10 through a flexible driving connection which permits the wheel 10 a limited vertical movement relatively to the quill 35 and the housing 14.

This driving connection consists primarily of a driving disk 39 which is fixed upon the end of the quill 35 and has two driving pins 40 fixed therein diametrically opposite each other, an annular floating drive plate 41 which abuts the outer face of the disk 39 and has two radial slots 42 formed therein diametrically opposite each other to receive the outer ends of the pins 40, a slide block 43 arranged upon the outer end of each pin 40 and fitted in the corresponding slot 42 to slide therein toward and from the axle 9, an annular retaining plate 44 which encircles the hub of the wheel 10 and is urged by helical compression springs 45 against the floating plate 41 to hold it in engagement with the disk 39, two driving pins 46 which are fixed diametrically opposite each other in the wheel 10 and project through the retaining plate 44 into two radial slots 47 which are formed in the floating plate 41 diametrically opposite each other and equally spaced from the slots 42, and a slide block 48 arranged upon the inner end of each pin 46 and fitted in its slot 47 to slide therein toward and from the axle 9.

The motor 27 (Figs. 3 and 4) has a pinion 49 fixed upon its rotor shaft in mesh with a driven gear 50 which is fixed upon a driving quill 51 through which the axle 8 extends.

The quill 51 is connected to the wheel 10 on the axle 8 in the same manner as the quill 35 is connected to the wheel 10 on the axle 9, and it is supported in the left end of the housing 14 in the same manner that the quill 35 is supported in the right end thereof, the housing 14 being provided at its left end with a cap 52 which is substantially the same as the cap 36 at the right end of the housing 14.

Since the motor 26 is connected through double reduction gearing to the wheel 10 upon the far side of the truck and the motor 27 is connected through single reduction gearing to the wheel 10 upon the near side of the truck, the rotors of the motors 26 and 27 must rotate in opposite directions in order to rotate the truck wheels in the same direction.

Liquid for driving the motors 26 and 27 one direction is delivered thereto through two passages 53 which communicate with each other at the lower ends thereof and extend upward through the post 19 of the center bearing 2 and terminate diametrically opposite each other upon the periphery of the spherical bearing 23. The passages 53 are connected at the lower ends thereof to the motor 27 through a pipe 54 and to the motor 26 through a pipe 55 and a bypass valve 56 which is shown in longitudinal section in Figs. 13 to 15.

Liquid for driving the motors 26 and 27 in the opposite direction is delivered thereto through two passages 57 which communicate with each other at the lower ends thereof and extend upward through the post 19 of the center bearing 2 and terminate diametrically opposite each other upon the periphery of the spherical bearing 23. The passages 57 are connected at the lower ends thereof to the motor 27 through a pipe 58 and to the motor 26 through a pipe 59 and the bypass valve 56.

In order to form the passages 53 and 57 in the post 19, it is ordinarily necessary to extend them vertically through the head 23 and then plug their upper ends, the separate bearing block 23' covering the plugs and providing a smooth bearing surface for the bearing block 24".

Figure 11:
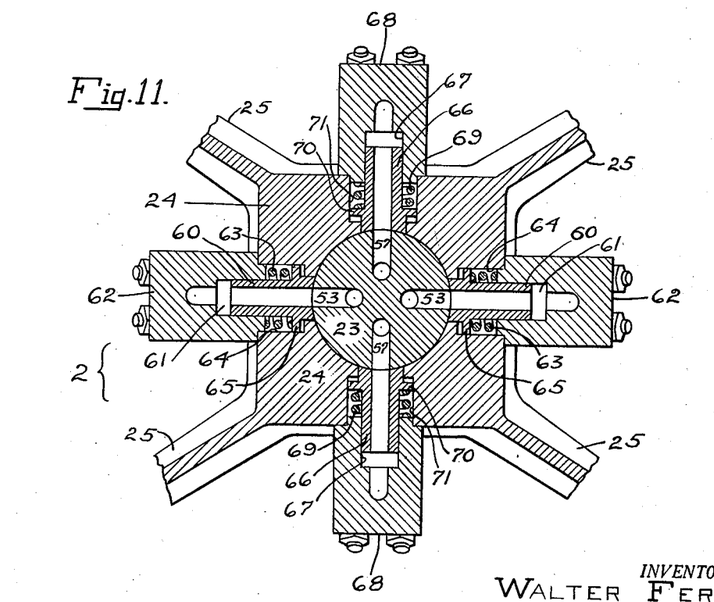
Fig. 11 is a sectional plan view of the center bearing taken on the irregular line 11—11 of Fig. 4.

As shown in Figs. 4 and 11, each passage 53 communicates at its upper end with the bore of a hollow plunger 60 which extends through the side wall of the bearing cap 24 and has its inner end closely fitted therein to be guided thereby and also closely fitted to the spherical surface of the head 23 and its outer part closely fitted in a bore 61 formed in a pipe fitting 62 which is rigidly secured to the cap 24, the two pipe fittings 62 being arranged diametrically opposite each other.

The plunger 60 is urged inward against the head 23 by any fluid pressure prevailing in the bore 61 and by a helical compression spring 63 which encircles it and is arranged in a counterbore 64 formed in the cap 24. The counterbore 64 is provided with a suitable drain so that no pressure can accumulate therein by leakage from the bore 61. The spherical area of the end of the hollow plunger 60 in contact with the spherical head 23 is such that fluid pressure in the bore 61 is able to hold the spherical surfaces in close contact against the counter pressure of the oil film leaking out between them.

The outer end of the spring 63 abuts the end of the fitting 62 and its inner end abuts a collar 65 which is arranged upon the plunger 60 intermediate its ends and adapted to abut the bottom of the counterbore 64 and limit the inward movement of the plunger 60 when the cap 24 is removed from the head 23.

Each passage 57 communicates at its upper end with the bore of a hollow plunger 66 which is substantially identical to the plunger 60 and has its inner end fitted to the spherical surface of the head 23 and its outer end closely fitted in a bore 67 formed in a pipe fitting 68 which is rigidly connected to the cap 24, the two fittings 68 being arranged diametrically opposite each other as shown in Fig. 11.

The plunger 66 is urged inward against the bearing 23 by any fluid pressure prevailing in the bore 67 and by a helical compression spring 69 arranged between the inner end of the fitting 68 and a collar 70 which is fixed upon the plunger 66 and arranged in a counterbore 71 formed in the cap 24 and containing the spring 69.

The upper or outer ends of the passages 53 and 57 and the inner ends of the bores of the plungers 60 and 66 are made large enough to permit the bore of each plunger to remain in communication with the corresponding passage in the head 23 when the cap 24 is rotated upon the head 23 due to the locomotive traveling along a curved track.

When the locomotive is operated in one direction, pressure liquid is delivered from the pumps 4 and 4ª to the motors 26 and 27 through both of the passages 53 and liquid is returned from the motors to the pumps through both of the passages 57 and, when the locomotive is operated in the opposite direction, the flow of liquid is reversed.

As the passages 53 or 57 through which the pressure liquid flows in either direction of operation are arranged diametrically opposite each other, the cap 24 and the head 23 are hydraulically balanced during the operation of the locomotive in either direction.

The weight of the locomotive body holds the cap 24 firmly in engagement with the head 23, and the pressure of the driving liquid holds the hollow plungers 60 and 66 firmly in engagement with the head 23, thereby providing substantially fluid-tight joints between the pumps and the motors.

Further, by transmitting the driving liquid through the center bearing, the necessity of providing flexible fluid connections between the body and the truck is avoided, and the body may be raised and the truck removed from beneath the same without disconnecting any pipes or fluid connections.

In order to collect any small volumes of liquid which may leak from between the sliding joints formed by the hollow plungers 60 and 66 with the cap 24 and the head 23, a collector ring 72 is fitted upon the post 19 of the center bearing 2 in engagement with the bearing block 21 and has its outer edge fitted within a depending annular flange 73 carried by the cap 24, as shown in Fig. 4.

The ring 72 may have a suitable gasket arranged upon its upper side and closely fitted to the post 19 and the flange 73 and held in position by helical compression springs which are arranged between it and the cap 24 and which also hold the ring 72 in engagement with the block 21.

Oil which leaks from the joints around the head 23 collects upon the ring 72 and is drained therefrom into the housing 14 through a suitable channel (not shown).

Figure 1:
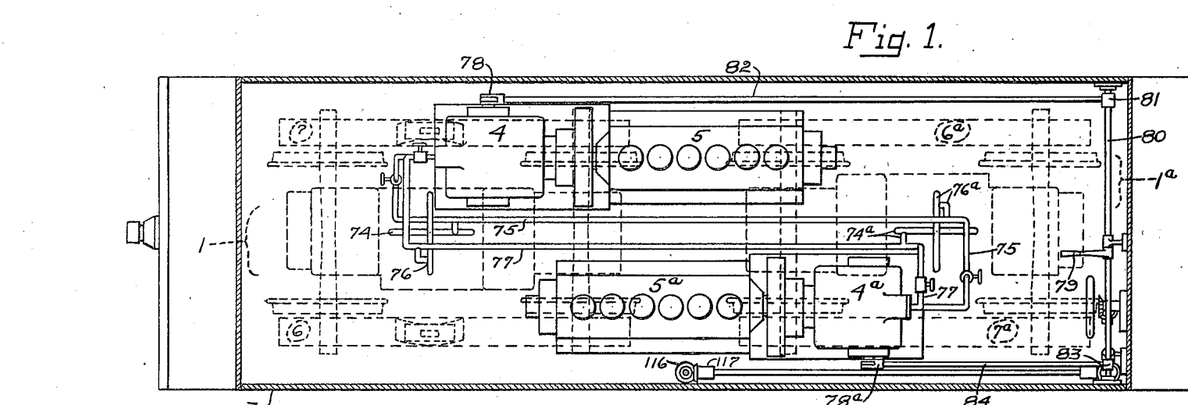
Fig. 1 is a diagrammatic top plan view of the locomotive.

When the locomotive is operated in one direction, liquid for operating the motors 26 and 27 is delivered to the passages 53 through a pipe 74 (Figs. 1, 2, and 13) which is connected at one of its ends to a main pipe 75 and divided into two branches which are connected, respectively, to the two fittings 52, and liquid discharged from the motors 26 and 27 flows through the passages 57 and a pipe 76 which is connected at one of its ends to a main pipe 77 and divided into two branches which are connected, respectively, to the two fittings 68.

The main pipes 75 and 77 connect the corresponding ports of the pumps 4 and 4ª to each other whereby both pumps deliver liquid into one of these pipes and have liquid returned thereto through the other pipe, depending upon the adjustments of the pumps which are ordinarily adjusted simultaneously.

Figures 12, 13, 14, 15, 16:
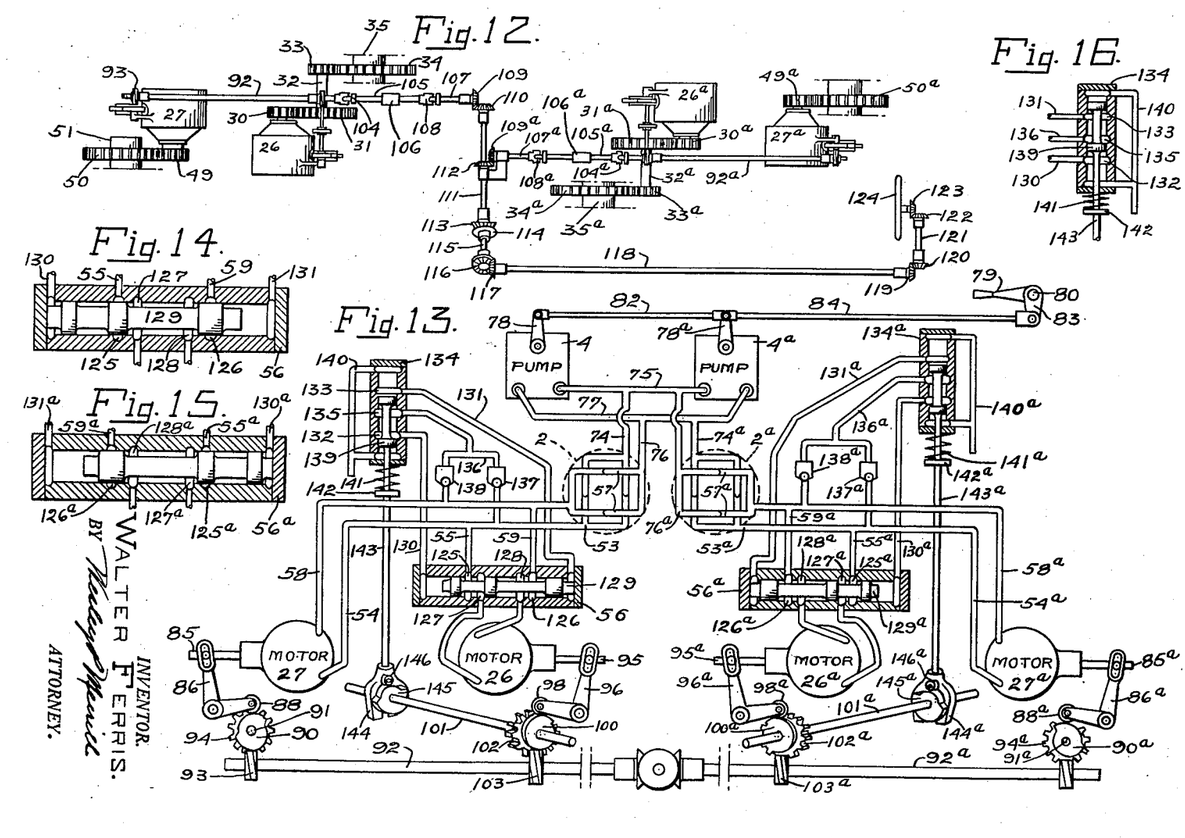
Fig. 12 is a diagram showing the several motor controls connected to a single manual control.
Fig. 13 is a diagram showing the hydraulic circuit and certain control mechanisms.
Figs. 14, 15, and 16 are longitudinal sections showing the pilot and reversing valves with the plungers thereof in different operative positions from those shown in Fig. 13.

As shown in Fig. 13, the center bearing 2ª of the truck 1ª has its passages connected to the motors 26ª and 27ª in the same manner as the passages of the center bearing 2 are connected to the motors 26 and 27; the passages 53ª and 57ª being connected, respectively, to the motor 27ª by pipes 54ª and 58ª and to the motor 26ª by pipes 55ª and 59ª and a bypass valve 56ª.

However, as the truck 1ª is reversed relatively to the truck 1 and as its motors 26ª and 27ª must operate in a direction opposite to the direction of operation of the motors 26 and 27 in order to drive the truck 1ª in the same direction that the truck 1 is driven, the passages 53ª are connected to the supply pipe 77 by a branched pipe 74ª, which is similar to the pipe 74, and the passages 57ª are connected to the supply pipe 75 by a branched pipe 76ª which is similar to the pipe 76.

Therefore, when liquid is delivered from the main pipe 75 through the pipe 74 to the passages 53 to operate the motors 26 and 27 in one direction, liquid will flow from the main pipe 75 through the pipe 76ª to the passages 57ª to operate the motors 26ª and 27ª in the opposite direction and thereby drive the truck 1ª in the same direction that the truck 1 is driven by the motors 26 and 27, and liquid will be returned to the pipe 77 from the motors 26 and 27 through the passages 57 and the pipe 76 and from the motors 26ª and 27ª through the passages 53ª and the pipe 74ª.

Conversely, when the pumps 4 and 4ª are delivering liquid into the pipe 77 and receiving liquid from the pipe 75, liquid will flow from the pipe 77 through the pipe 76 and the passages 57 to the motors 26 and 27 and through the pipe 74ª and passages 53ª to the motors 26ª and 27ª, and liquid will be returned to the pipe 75 through the passage 53 and the pipe 74 from the motors 26 and 27 and through the passages 57ª and the pipe 76ª from the motors 26ª and 27ª.

The delivery of liquid into the pipe 75 or the pipe 77 and the rate at which the liquid is delivered is determined by the adjustment of the pumps 4 and 4ª which are provided, respectively, with stroke-adjusting mechanisms 78 and 78ª for varying the stroke of displacement of each pump from zero to maximum in either direction.

The pumps 4 and 4ª may be of the well known type manufactured by The Oilgear Company of Milwaukee, Wisconsin. In this type of pump, the cylinders revolve about a hollow shaft or pintle through which liquid flows to and from the cylinders, and the direction and volume of delivery are determined by the direction and distance the axis of revolution of the cylinders is displaced from the axis of the pintle. When these two axes coincide, the pump is at zero stroke and no liquid is delivered thereby. When the two axes are separated, the pump delivers liquid at a rate determined by the distance between the axes and in a direction determined by the direction in which one axis is displaced from the other axis.

The stroke-adjusting mechanisms 78 and 78ª are both operated by a control lever 79 which is fixed upon a shaft 80 arranged at one end of the body 3 and journaled in bearings carried thereby.

The shaft 80 has a lever 81 fixed upon one of its ends and connected to the stroke-adjusting mechanism 78 by a rod 82, and a lever 83 fixed upon its other end and connected to the stroke-adjusting mechanism 78ª by a rod 84 whereby operation of the lever 79 operates the stroke-adjusting mechanisms 78 and 78ª simultaneously.

When the lever 79 is in its central or neutral position, the pumps 4 and 4ª are at zero stroke and no liquid is delivered thereby. When the lever 79 is moved in one direction, the pumps 4 and 4ª will both deliver liquid into the pipe 75 at a rate determined by the distance through which the lever 79 is moved from its neutral position and, when the lever 79 is moved in the opposite direction, the pumps 4 and 4ª will both deliver liquid into the pipe 77 at a rate determined by the distance the lever 79 is moved from its neutral position.

The motors 26, 26ª, 27, and 27ª may be of the same type as the pumps 4 and 4ª except that the stroke-adjusting mechanism of each motor is movable in but one direction from its zero stroke position for the reason that the motors are reversed by reversing the pump and thereby reversing the direction of flow of the liquid which drives the motors.

The stroke-adjusting mechanism of the motor 27 has a rod 85 (Figs. 3, 4, and 13) extending therefrom and connected by a pin and slot connection to the end of one arm of a bell-crank lever 86 which is pivoted upon a stationary bracket 87. The lever 86 has a roller 88 journaled in the end of its other arm and urged by a spring 89 against the periphery of a cam 90 which is fixed upon a transverse shaft 91 journaled in bearings carried by the motor 27 and the housing 14.

The spring 89 tends to swing the lever 86 in a direction to move the rod 85 inward and thereby shorten the stroke of the motor 27, and the cam 90 is adapted to swing the lever 86 in the opposite direction against the action of the spring 89 to move the rod 85 outward and thereby increase the stroke of the motor 27, the cam 90 being shown in Fig. 4 in position to hold the motor 27 at full stroke.

The cam 90 is rotated by a control shaft 92 which has a worm 93 fixed thereon in mesh with a worm gear 94 fixed upon the shaft 91. The control shaft 92 extends longitudinally of the truck and is journaled in suitable bearings carried by the motors 26 and 27.

The stroke-adjusting mechanism of the motor 26 has a rod 95 extending therefrom and connected by a pin and slot connection to the end of one arm of a bell-crank lever 96 which is pivoted upon a stationary bracket 97. The lever 96 has a roller 98 journaled in the end of its other arm and urged by a spring 99 against the periphery of a cam 100 which is fixed upon a transverse shaft 101 journaled in bearings carried by the motor 26 and the housing 14.

The shaft 101 has a worm gear 102 fixed thereon in mesh with a worm 103 which is fixed upon the control shaft 92, whereby the control shaft 92 may rotate the cam 100 in synchronism with the cam 90.

The spring 99 tends to swing the lever 96 in a direction to move the rod 95 inward and thereby shorten the stroke of the motor 26 and the cam 100 is adapted to swing the lever 96 in the opposite direction against the action of the spring 99 to move the rod 95 outward and thereby increase the stroke of the motor 26, the cam 100 being shown in Fig. 4 in position to hold the pump 26 at full stroke.

The control shaft 92 (Figs. 4 and 12) is connected by a universal joint 104 to one end of an extensible shaft 105 which is provided intermediate its ends with an extension joint 106 and has its other end connected to one end of a shaft 107 by a universal joint 108.

The shaft 107 has a bevel pinion 109 fixed upon its other end in mesh with a bevel pinion 110 fixed upon the far end of a transverse shaft 111 which is provided intermediate its ends with a bevel pinion 112 to drive the motor control mechanism on the truck 1ª in unison with the motor control mechanism on the truck 1.

The motor control mechanism on the truck 1ª is substantially the same as that just described, and like parts thereof have been indicated by the same reference numerals with the exponent "a" added. This mechanism is driven from the shaft 111 through a bevel pinion 109ª which corresponds to the pinion 109 and meshes with the pinion 112.

The shaft 111 has a bevel pinion 113 fixed upon its near end in mesh with a bevel pinion 114 fixed upon the lower end of the vertical shaft 115 which extends upward through the floor of the body 3 and has a bevel pinion 116 fixed upon its upper end in mesh with a bevel pinion 117 carried by a longitudinal shaft 118 upon one end thereof.

The shaft 118 is journaled in suitable bearings carried by the body 3 and has a bevel pinion 119 fixed upon its other end in mesh with a bevel pinion 120 fixed upon the lower end of an inclined shaft 121 which has a bevel pinion 122 fixed upon its upper end and in mesh with a bevel pinion 123 carried by a control wheel 124.

A motor driven locomotive is ordinarily provided with controls at each end thereof in order that the operator may control the locomotive from either end, but the left end controls have been omitted from the drawings for the reason that they are exactly the same as the controls shown on the right end of the locomotive.

In starting the locomotive from a stationary position, at which time the pumps 4 and 4ª are at zero stroke, the control wheel 124 is operated to adjust the motors to full stroke in order that they may have the highest torque and then the control lever 79 is operated to adjust the pumps and cause them to deliver liquid at a limited volumetric rate to the motors whereby the full power of the engines 5 and 5ª is available for operating the motors at slow speed and enabling them to exert high rotative forces upon the driving wheels and thereby start the locomotive and its load.

After the locomotive is started, the control lever 79 may be operated to increase pump displacement and thereby increase the speed of the locomotive until the pumps are at full stroke and then the control wheel 124 may be operated to reduce motor displacement and thereby further increase the motor speed with the resultant increase in speed of the locomotive.

However, a rotary hydraulic motor will not operate efficiently above certain speeds nor after its displacement has been reduced below a certain minimum, and if the motors were all connected to the driving wheels through gearing of the same ratio, they would all operate at the same speed and the maximum speed of the locomotive would be reached when the motor displacement had been reduced to a given minimum, for instance, one-quarter stroke.

Therefore, in order to enable the locomotive to attain higher speeds, the motors 26 and 26ª are connected to the driving wheels through gearing having a higher ratio than the gearing which connects the motors 27 and 27ª to the driving wheels, as previously described, whereby the motors 26 and 26ª operate at higher speeds than the motors 27 and 27ª but are capable of transmitting greater rotative forces to the driving wheels than the motors 26 and 26ª. The motor displacement is reduced until the motors 26 and 26ª are approximately at the shortest efficient stroke, and then the motors 26 and 26ª are quickly adjusted to zero stroke and short-circuited and the entire output of the pumps 4 and 4ª diverted to the motors 27 and 27ª whereby the rotors of the motors 26 and 26ª may rotate freely without consuming any of the driving liquid and the locomotive is driven solely by the motors 27 and 27ª which may then be adjusted to reduce the displacement thereof and thereby enable them to drive the locomotive at high speed. The attainable speed is twice as high with two motors short-circuited as it would be with all four motors working at minimum stroke.

The motor 26 is short-circuited and relieved from working pressure by the valve 56 (Figs. 3 and 13) which has a port 125 to which the pipe 55 is connected, a port 126 to which the pipe 59 is connected, and two ports 127 and 128 which are arranged between the ports 125 and 126 and are each connected to a port of the motor 26.

The flow of liquid through the valve 56 is controlled by its plunger 129 which is urged in one direction by liquid delivered to one end of the valve casing through a pipe 130 and in the other direction by liquid delivered to the other end of the valve casing through a pipe 131.

The other ends of the pipes 130 and 131 are connected, respectively, to two ports 132 and 133 formed in the casing of a pilot valve 134 which has a port 135 formed therein between the ports 132 and 133 and connected through a pipe 136 and a check valve 137 to the pipe 54 and through the pipe 136 and a check valve 138 to the pipe 58. Pressure liquid may thus flow to the port 135 at all times regardless of the direction of actuation of the motor 26.

The casing of the pilot valve 134 has a plunger 139 fitted therein to control the flow of liquid therethrough, and it has its two ends connected to a drain pipe 140 to permit the plunger 139 to reciprocate freely.

Figure 8:
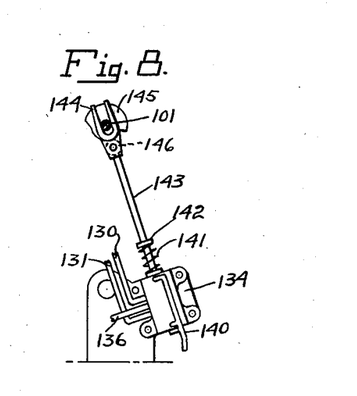
Fig. 8 is a detail view taken in the plane of the line 8—8 of Fig. 3 and showing a valve operating mechanism.
Figure 10:
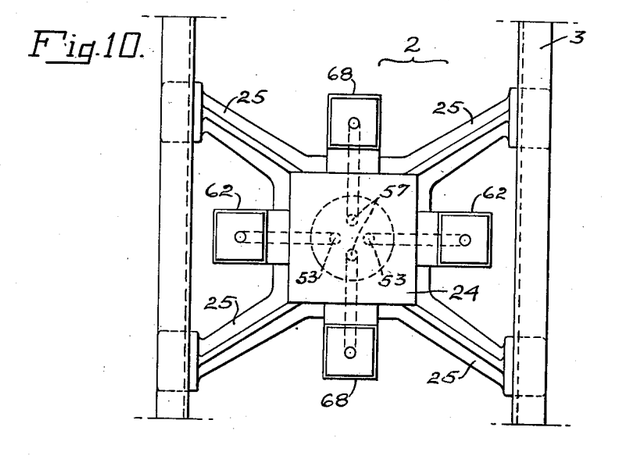
Fig. 10 is a top plan view of the center bearing taken on the line 10—10 of Fig. 4.

The pilot valve plunger 139 is urged upward by a helical compression spring 141 arranged between the end of the pilot valve casing and a collar 142 fixed upon a valve stem 143 which is connected at its lower end to the plunger 139 and extends upward toward the transverse shaft 101, as shown in Figs. 4 and 8.

The stem 143 is provided at its upper end with a bifurcated guide 144 which is arranged astride the transverse shaft 101 adjacent a cam 145 fixed thereon.

The guide 144 carries upon one side thereof a roller 146 which is arranged beneath the cam 145 and urged against the periphery thereof by the spring 141 whereby rotation of the shaft 101 through a given angular distance will cause the cam 145 to depress the stem 143 and move the pilot valve plunger 139 from the position shown in Fig. 13 to the position shown in Fig. 16 and reversal of the shaft 101 through the same angular distance will permit the spring 141 to return the plunger 139 to the position shown in Fig. 13.

When the plunger 139 is in the position shown in Fig. 13, liquid will flow from the pipe 54 or the pipe 58 through the check valve 137 or the check valve 138, the pipe 136, the ports 135 and 132 and the pipe 130 to the left end of the valve 56 and move its plunger 129 to the position shown in Fig. 13 and thereby permit pressure liquid to flow to and from the motor 26.

When the plunger 139 is in the position shown in Fig. 16, liquid will flow from the pipe 54 or the pipe 58 through the check valve 137 or the check valve 138, the pipe 136, the ports 135 and 133 and the pipe 131 to the right end of the valve 56 and move its plunger 129 to the position shown in Fig. 14 in which position of the plunger 129 the ports 125 and 126 are closed and the ports 127 and 128 are in communication with each other. Consequently, no liquid can be delivered to the motor 26 and the liquid previously delivered thereto is diverted to the motor 27 to increase the speed thereof, and any liquid which may be discharged from the exhaust port of the motor 26 is returned to the intake port thereof through the valve 56.

The cams 90 and 100, which are carried by the shafts 91 and 101 and are rotated thereby in synchronism with each other, as previously explained, are so shaped and positioned that rotation thereof from the neutral position shown in Fig. 4 will first gradually reduce the displacement of the motor 27 at a slow rate and the displacement of the motor 26 at a faster rate until the motor 26 is at short stroke, then quickly reduce the displacement of the motor 26 to zero and increase the displacement of the motor 27 by a corresponding amount at which time the valve 56 is operated to short-circuit the motor 26, and then gradually decrease the displacement of the motor 27.

The motors 26ª and 27ª on the truck 1ª are controlled by mechanism which is identical to the mechanism which controls the motors 26 and 27, and the corresponding parts thereof have been indicated by the same reference numerals with the exponent "a" added.

When the control wheel 124 has been turned far enough to cause the displacements of the motors 26 and 26ª to be reduced to zero and the valves 56 and 56ª to be operated, the entire output of the pumps 4 and 4ª is available for driving the motors 27 and 27ª at one-quarter stroke and thereby enables them to drive the locomotive at high speed.

The locomotive may be decelerated and stopped by means of air brakes in the usual manner, and it may also be decelerated by operating the control wheel 124 to increase motor displacement and/or operating the control lever 79 to decrease pump displacement.

The inertia of the moving locomotive acting through the driving wheels will then drive the motors which will function as pumps and drive the pumps which will function as motors and drive the engines. The energy of the moving locomotive may thus be dissipated in driving the motors, pumps and engines, and a part of the energy dissipated through the engines may be utilized in compressing air for use by the air brakes and engines.

As the locomotive comes to rest, the pumps are adjusted to zero stroke to lock the motor circuits and enable the motors to hold the locomotive in a stationary position without the aid of brakes.

For the purpose of illustration, the cams 90, 100 and 145 are shown in Figs. 4, 8, and 13 in their neutral positions and so shaped that rotation of the shafts 91 and 101 through the first 90° will cause the cam 100 to reduce the stroke of the motor 26 from full stroke to one-quarter stroke and the cam 90 to reduce the stroke of the motor 27 from full stroke to three-quarters stroke while the cam 145 maintains a concentric part of its periphery in contact with the roller 146 and does not operate the pilot valve 144, rotation of the shafts 91 and 101 through the next 10° will cause the cam 100 to reduce the stroke of the motor 26 from one-quarter stroke to zero stroke and the cam 90 to increase the stroke of the motor 27 from three-quarters stroke to full stroke. Simultaneously, the cam 145 operates pilot valve 134 which causes valve 55 to short-circuit the motor 26 and also to cut this motor off from the fluid circuit and protect it from the working pressure while it is idling. The effect of the simultaneous adjustment of one motor from one-quarter stroke to zero stroke and the other motor from three-fourths to full stroke is that there is no change in the rate of flow of liquid to the two motors taken together. Rotation of the shafts 91 and 101 through the next 215° will cause the cam 90 to reduce the stroke of the motor 27 from full stroke to one-quarter stroke while the roller 98 remains in contact with a concentric part of the cam 100 and holds the motor 26 at zero stroke and the roller 146 remains in contact with a concentric part of the cam 145 and holds the plunger of the pilot valve 134 in its operated position.

The motors 26ª and 27ª on the truck 1ª are controlled by mechanism which is identical to the mechanism which controls the motors 26 and 27, and the corresponding parts thereof have been indicated by the same reference numerals with the exponent "a" added.

When the control wheel 124 has been turned far enough to cause the displacements of the motors 26 and 26ª to be reduced to zero and the valves 56 and 56ª to be operated, the entire output of the pumps 4 and 4ª is available for driving the motors 27 and 27ª at one-quarter stroke and thereby enables them to drive the locomotive at high speed.

The locomotive may be decelerated and stopped by means of air brakes in the usual manner, and it may also be decelerated by operating the control wheel 124 to increase motor displacement and/or operating the control lever 79 to decrease pump displacement.

The inertia of the moving locomotive acting through the driving wheels will then drive the motors which will function as motors and drive the engines. The energy of the moving locomotive may thus be dissipated in driving the motors, pumps and engines, and a part of the energy dissipated through the engines may be utilized in compressing air for use by the air brakes and engines.

As the locomotive comes to rest, the pumps are adjusted to zero stroke to lock the motor circuits and enable the motors to hold the locomotive in a stationary position without the aid of brakes.

When the locomotive is pulling an independently supported load in a given direction, a part of its weight is shifted from the front wheels of each truck to the rear wheels thereof, because of the moment caused by the tractive force of the rails upon the wheels, multiplied by the height of the draw bar above the track. The amount of weight thus shifted is proportional to the tractive force exerted by the locomotive, and the tractive force is proportional to the working pressure existing in the fluid which drives the motors.

Figure 2:
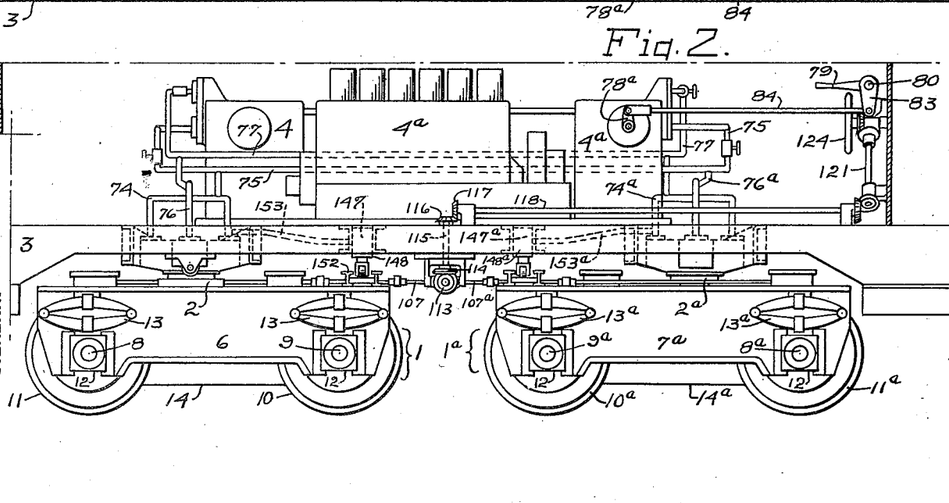
Fig. 2 is a diagrammatic side elevation thereof.

When the locomotive starts to move a load toward the right in respect to Fig. 2, the tractive force on the left hand draw bar tends to shift a part of the weight carried by truck 1 from axle 9 to axle 8 but is prevented from doing so by a hydraulic jack 147 arranged between the body 3 and the top of truck 1 above axle 9. This jack communicates with the pressure side of the working circuit through pipe 153, and therefore transfers to axle 9 a part of the weight of the car body, that part of the weight transferred being at all times proportional to the existing tractive force and working pressure. The weight thus transferred, of course, reduces the part of the car body weight resting upon the center bearing 2. Jack 147 is so proportioned that the resulting load upon axle 9 is greater than upon axle 8, although the location of center bearing 2 nearer to axle 8 would produce an opposite condition were the jack not used.

Referring to Fig. 4, it will be noted that motor 26 drives axle 9 through a higher gear ratio than the gear ratio between motor 27 and axle 8. This produces a higher tractive force on axle 9, and requires a heavier load thereon to prevent the wheels on axle 9 from slipping before the wheels on axle 8 slip under a maximum traction effort.

As truck 1$^a$ is turned end for end in respect to truck 1, the shifting of weight from one of its axles to the other is also reversed. That is, of the weight resting upon the axle 8$^a$ when there is no tractive force there is transferred to axle 9$^a$ an amount which is always proportional to the existing draw bar pull. The location of center bearing 2$^a$ is so chosen that this automatic weight transfer produces the required higher loading of axle 9$^a$ without requiring any pressure in the jack 147$^a$, which is located approximately above axle 9$^a$.

If the locomotive moved to the left in respect to Fig. 2, exerting a pull upon the right hand draw bar, these conditions would be reversed. Truck 1 would then be the forward truck and the draw bar pull would then automatically transfer a proportional amount of weight from axle 8 to axle 9, producing the requisite loading upon axle 9 without any pressure in jack 147. Truck 1$^a$ would then be the rear truck, and as the working pressure would then communicate with jack 147$^a$, this jack would transfer a sufficient amount of the car body weight to axle 9$^a$ to maintain its tractive force notwithstanding the tendency of the draw bar to transfer weight from axle 9$^a$ to axle 8$^a$.

By locating each center bearing nearer to one axle than to the other and by turning one truck end for end, the tendency of the draw bar force to unload one axle in each truck and the tendency to slip the wheels on the unloaded axle is overcome. Also, by placing each center bearing at one side of the transverse center line of its truck, room is provided for the additional gearing shown between one of the motors and its axle and only one jack is required on each truck to correct the tendency to transfer weight instead of the two jacks which would be required if the center bearing were midway between the two axles.

The jack 147 (Figs. 2, 4, and 5) consists of a cylinder 148, which is rigidly secured to the underside of the body 3 upon the longitudinal centerline thereof, and a ram 149 which is fitted in the cylinder 148 and has a roller 150 journaled in the lower end thereof.

The roller 150 engages a pressure plate 151 which is rigidly secured to two beams 152 arranged across the top of the side frames 6 and 7 at the inner ends thereof.

The jack 147 has its cylinder 148 connected by a pipe 153 (Fig. 2) to the pipe 74 and the jack 147$^a$ has its cylinder 148$^a$ connected by a pipe 153$^a$ to the pipe 74$^a$ so that either one cylinder or the other is open to pump pressure, depending upon the direction in which the locomotive is moving.

The arrangement is such that, when the pumps are delivering liquid to the motors through the pipes 74 and 76$^a$ and receiving liquid from the motors through the pipes 74$^a$ and 76, the locomotive will move toward the right in respect to Fig. 2 and the cylinder 148$^a$ will be open to the return side of the pump, whereby the jack 147$^a$ will exert practically no force upon the truck 1$^a$ but the jack 147 will exert upon the front end of the truck 1 a loading force which prevents shifting of weight from the axle 9 to the axle 8 and which will shift weight from the axle 8 to the axle 9. The tendency to shift weight from the front axle to the rear axle of each truck and the force in the jack to correct this tendency are always proportional to the then existing draw bar pull.

When the pumps are delivering liquid to the motors through the pipes 74$^a$ and 76 and receiving liquid from the motors through the pipes 74 and 76$^a$, the locomotive will move toward the left in respect to Fig. 2 and the cylinder 148$^a$ will be open to pump pressure and the cylinder 148 will be open to the return side of the pump whereby the jack 147 will exert practically no force upon the truck 1 but the jack 147$^a$ will exert upon the front end of the truck 1$^a$ a loading force which prevents shifting of weight from the axle 9$^a$ to the axle 8$^a$ and which will shift weight from the axle 8$^a$ to the axle 9$^a$ upon the force exerted upon the load reaching a predetermined maximum.

When the locomotive is pulling a light load or is running idle so that there is little or no draw bar pull, the greater part of the weight remains upon axles 8 and 8$^a$ to which motors 27 and 27$^a$ are connected through a low gear ratio and can therefore exert a comparatively low tractive force. Sufficient weight, however, remains resting upon axles 9 and 9$^a$ to permit motors 26 and 26$^a$ to exert more tractive force than is then required. As increasing draw bar pulls are exerted, the corresponding pressure in the jack over the rear truck and the automatic weight transfer from the leading axle to the following axle of the forward truck, correspondingly increase and the loading of axles 9 and 9ᵃ so that the loads on these axles are always more than sufficient to develop their share of the tractive forces.

At high speeds the motors driving axles 9 and 9ᵃ are cut out and short-circuited, so that these axles develop no tractive force at the same time the draw bar pulls are proportionally less as the speeds increase, so that enough weight always remains upon axles 8 and 8ᵃ to develop their maximum tractive force.

The above described load shifting mechanism per se forms no part of the present invention but is described and claimed in application Serial No. 752,207, filed November 9, 1934.

The invention herein set forth is susceptible of various modifications and adaptations without departing from the scope thereof as hereafter claimed.

The invention is hereby claimed as follows:

1. In a self-propelled vehicle, the combination of a plurality of fluid motors for driving said vehicle, a source of motive fluid, means for connecting said motors to said source in parallel with each other whereby the supply of said fluid is divided between said motors to enable the same to produce high tractive forces at slow speeds, means for reducing the displacement of one motor to direct a correspondingly larger portion of said motive fluid to another motor and thereby increase the speed of said vehicle but decrease the tractive forces produced by said motors, and means for disconnecting said reduced displacement motor from said source to thereby direct additional liquid to another motor.

2. In a self-propelled vehicle, the combination of a plurality of fluid motors for driving said vehicle, a source of motive fluid, means for connecting said motors to said source in parallel with each other whereby the supply of said fluid is divided between said motors to enable the same to produce high tractive forces at slow speeds, means for reducing the displacement of one motor to direct a correspondingly larger portion of said motive fluid to another motor and thereby increase the speed of said vehicle but decrease the tractive forces produced by said motors, and means for automatically disconnecting said reduced displacement motor from said source upon its displacement being reduced to a predetermined minimum to thereby direct additional liquid to another motor.

3. In a self-propelled vehicle, the combination of two traction wheels, a fluid motor connected to each of said wheels to rotate the same and thereby drive said vehicle, a source of motive fluid, means for connecting said motors to said source in parallel with each other whereby the supply of said fluid is divided between said motors to enable the same to produce high tractive forces at slow speeds, and means for reducing the displacement of one motor to direct a correspondingly larger portion of said motive fluid to the other motor and thereby increase the speed of said wheels but decrease the tractive forces produced by said motors.

4. In a self-propelled vehicle, the combination of two traction wheels, a fluid motor connected to each of said wheels to rotate the same and thereby drive said vehicle, a source of motive fluid, means for connecting said motors to said source in parallel with each other whereby the supply of said fluid is divided between said motors to enable the same to produce high tractive forces at slow speeds, means for reducing the displacement of one motor to direct a correspondingly larger portion of said motive fluid to the other motor and thereby increase the speed of said wheels but decrease the tractive forces produced by said motors, and means for rendering said reduced displacement motor ineffective to drive said vehicle upon its displacement being reduced to a predetermined minimum.

5. In a self-propelled vehicle, the combination of two traction wheels, a fluid motor connected to each of said wheels to rotate the same and thereby drive said vehicle, a source of motive fluid, means for connecting said motors to said source in parallel with each other whereby the supply of said fluid is divided between said motors to enable the same to produce high tractive forces at slow speeds, means for reducing the displacement of one motor to direct a correspondingly larger portion of said motive fluid to the other motor and thereby increase the speed of said wheels but decrease the tractive forces produced by said motors, and means for short-circuiting said reduced displacement motor and disconnecting it from said source of fluid to thereby direct the entire supply of fluid to the other motor to increase the speed thereof.

6. A hydraulic locomotive, comprising a truck, a plurality of wheels supporting said truck, a variable displacement hydraulic motor connected to one of said wheels to rotate the same, a second variable displacement hydraulic motor hydraulically connected in parallel with said first motor and mechanically connected to another of said wheels to rotate the same, means for supplying motive fluid to said motors to drive the same, means for varying the displacements of said motors to thereby vary the speeds thereof including means for reducing the displacement of said first motor faster than the displacement of said second motor, and means for short-circuiting said first motor and delivering said motive fluid solely to said second motor upon the displacement of said first motor being reduced to a predetermined minimum.

7. A hydraulic locomotive, comprising a truck, a plurality of wheels supporting said truck, a variable displacement hydraulic motor connected to one of said wheels to rotate the same, a second variable displacement hydraulic motor hydraulically connected in parallel with said first motor and mechanically connected to another of said wheels to rotate the same, means for supplying motive fluid to said motors to drive the same, means for varying the displacements of said motors to thereby vary the speeds thereof including means for reducing the displacement of said first motor faster than the displacement of said second motor, means for suddenly reducing the displacement of said first motor from a predetermined minimum to zero and simultaneously increasing the displacement of said second motor by a substantially corresponding amount, and means for short-circuiting said first motor and delivering said motive fluid solely to said second motor upon the displacement of said first motor being reduced to substantially zero.

8. A locomotive, comprising a truck, a plurality of wheels supporting said truck, a fluid motor connected to one of said wheels to rotate the same at speeds having a given ratio to the motor speed to thereby drive said truck at speeds varying through a relatively low range, a second fluid motor connected to another of said wheels to rotate the same at speeds having a higher ratio to the motor speed to thereby drive said truck at speeds varying through a wider range, means for supplying motive fluid to said motors to drive the same, means for controlling the volume of fluid delivered to said motors to thereby vary the speeds thereof, and means for rendering said first motor ineffective to drive said truck upon the motor speed reaching a predetermined maximum whereby said second motor drives said truck without the aid of said first motor.

9. A locomotive, comprising a truck, a plurality of wheels supporting said truck, a fluid motor connected to one of said wheels to rotate the same at speeds having a given ratio to the motor speed to thereby drive said truck at speeds varying through a relatively low range, a second fluid motor connected to another of said wheels to rotate the same at speeds having a higher ratio to the motor speed to thereby drive said truck at speeds varying through a wider range, means for supplying motive fluid to said motors to drive the same, means for controlling the delivery of fluid to said motors, means for varying the strokes of said motors to thereby vary the speeds thereof, and means for rendering said first motor ineffective to drive said truck upon its stroke being reduced to a predetermined minimum whereby said second motor drives said truck without the aid of said first motor.

10. A locomotive, comprising a truck, a plurality of wheels supporting said truck, a fluid motor connected to one of said wheels to rotate the same at speeds having a given ratio to the motor speed to thereby drive said truck at speeds varying through a relatively low range, a second fluid motor connected to another of said wheels to rotate the same at speeds having a higher ratio to the motor speed to thereby drive said truck at speeds varying through a wider range, means for supplying motive fluid to said motors to drive the same, means for controlling the volume of fluid delivered to said motors to vary the speed and direction of motor actuation, means for varying the strokes of said motors to further vary the speeds thereof, and means for rendering said first motor ineffective to drive said truck upon its stroke being reduced to a predetermined minimum whereby said second motor drives said truck without the aid of said first motor.

11. A locomotive, comprising a truck, a plurality of wheels supporting said truck, a fluid motor connected to one of said wheels to rotate the same at speeds having a given ratio to the motor speed, a second fluid motor connected to another of said wheels to rotate the same at speeds having a higher ratio to the motor speed, means for supplying motive fluid to said motors to drive the same, means for controlling the delivery of fluid to said motors, means for varying the strokes of said motors to thereby vary the speeds thereof, and means for short-circuiting said first motor and delivering said fluid solely to said second motor upon the stroke of said first motor being reduced to a predetermined minimum.

12. A locomotive, comprising a truck, a plurality of wheels supporting said truck, a fluid motor connected to one of said wheels to rotate the same at speeds having a given ratio to the motor speed, a second fluid motor connected to another of said wheels to rotate the same at speeds having a higher ratio to the motor speed, means for supplying motive fluid to said motors to drive the same, means for controlling the volume of fluid delivered to said motors to vary the speed and direction of motor actuation, means for varying the strokes of said motors to further vary the speeds thereof, and means for short-circuiting said first motor and delivering said fluid solely to said second motor upon the stroke of said first motor being reduced to a predetermined minimum.

13. In a self-propelled vehicle, the combination of a plurality of fluid motors for driving said vehicle, a reversible variable displacement pump for supplying motive fluid to said motors, means for driving said pump, means for connecting said motors to said source in parallel with each other whereby the supply of said fluid is divided between said motors to enable the same to produce high tractive forces at slow speeds, means for varying the displacement of said pump to vary the rate of delivery of fluid to said vehicle and for reversing said pump to cause said motors to reverse the direction of vehicle movement, means for reducing the displacement of one motor to direct a correspondingly larger portion of said motive fluid to another motor and thereby increase the speed of said vehicle but decrease the tractive forces produced by said motors, and means for disconnecting said reduced displacement motor from said source to thereby direct additional liquid to another motor.

14. In a self-propelled vehicle, the combination of a plurality of fluid motors for driving said vehicle, a reversible variable displacement pump for supplying motive fluid to said motors, means for driving said pump, means for connecting said motors to said source in parallel with each other whereby the supply of said fluid is divided between said motors to enable the same to produce high tractive forces at slow speeds, means for varying the displacement of said pump to vary the rate of delivery of fluid to said motors to thereby vary the speed of said vehicle and for reversing said pump to cause said motors to reverse the direction of vehicle movement, means for reducing the displacement of one motor to direct a correspondingly larger portion of said motive fluid to another motor and thereby increase the speed of said vehicle but decrease the tractive forces produced by said motors, and means for automatically disconnecting said reduced displacement motor from said source upon its displacement being reduced to a predetermined minimum to thereby direct additional liquid to another motor.

15. A hydraulic locomotive, comprising a truck, a plurality of wheels supporting said truck, a variable displacement hydraulic motor connected to one of said wheels to rotate the same, a second variable displacement hydraulic motor hydraulically connected in parallel with said first motor and mechanically connected to another of said wheels to rotate the same, a pump for supplying motive fluid to said motors to drive the same, means for driving said pump, means for reversing said pump to reverse the direction of motor actuation and for varying the displacement of said pump to thereby vary the speed of said motors, means for varying the displacements of said motors to thereby vary the speeds thereof including means for reducing the displacement of said first motor faster than the displacement of said second motor, and means for short-circuiting said first motor and delivering said motive fluid solely to said second motor upon the displacement of said first motor being reduced to a predetermined minimum.

16. In a hydraulic locomotive, the combination of a first and a second variable displacement hydraulic motor hydraulically connected in parallel with each other for driving said locomotive, a pump for supplying motive fluid to said motors to drive the same, means for driving said pump, means for varying the displacements of said motors to thereby vary the speeds thereof including means for reducing the displacement of said first motor faster than the displacement of said second motor, and means for short-circuiting said first motor and delivering said motive fluid solely to said second motor upon the displacement of said first motor being reduced to substantially zero.

17. In a hydraulic locomotive, the combination of a first and a second variable displacement hydraulic motor hydraulically connected in parallel with each other for driving said locomotive, a pump for supplying motive fluid to said motors to drive the same, means for driving said pump, and means for varying the displacements of said motors to thereby vary the speeds thereof including means for reducing the displacement of said first motor faster than the displacement of said second motor and means for suddenly reducing the displacement of said first motor from a predetermined minimum to zero and simultaneously increasing the displacement of said second motor by a substantially corresponding amount.

WALTER FERRIS.

CERTIFICATE OF CORRECTION.

Patent No. 2,037,373. April 14, 1936.

WALTER FERRIS.

It is hereby certified that error appears in the printed specification of the above numbered patent requiring correction as follows: Page 6, first column, beginning with line 57, strike out all to and including the word and period "brakes.", same page, second column, line 17; and second column, line 75, before "motors" second occurrence, insert the words pumps and drive the pumps which will function as; and that the said Letters Patent should be read with these corrections therein that the same may conform to the record of the case in the Patent Office.

Signed and sealed this 14th day of July, A. D. 1936.

Henry Van Arsdale (Seal) Acting Commissioner of Patents.